(12) United States Patent
Flajslik et al.

(10) Patent No.: US 11,989,599 B2
(45) Date of Patent: May 21, 2024

(54) ISOLATING COMMUNICATION STREAMS TO ACHIEVE HIGH PERFORMANCE MULTI-THREADED COMMUNICATION FOR GLOBAL ADDRESS SPACE PROGRAMS

(71) Applicant: Intel Corporation, Santa Clara, CA (US)

(72) Inventors: Mario Flajslik, Hudson, MA (US); James Dinan, Hopkinton, MA (US)

(73) Assignee: Intel Corporation, Santa Clara, CA (US)

( * ) Notice: Subject to any disclaimer, the term of this patent is extended or adjusted under 35 U.S.C. 154(b) by 208 days.

(21) Appl. No.: 16/880,277

(22) Filed: May 21, 2020

(65) Prior Publication Data

US 2021/0255910 A1    Aug. 19, 2021

Related U.S. Application Data

(63) Continuation of application No. 14/670,733, filed on Mar. 27, 2015, now Pat. No. 10,671,457.

(51) Int. Cl.
*G06F 9/54*    (2006.01)
*G06F 9/52*    (2006.01)

(52) U.S. Cl.
CPC .............. *G06F 9/544* (2013.01); *G06F 9/52* (2013.01)

(58) Field of Classification Search
CPC .................................. G06F 9/544; G06F 9/52
See application file for complete search history.

(56) References Cited

U.S. PATENT DOCUMENTS

| 10,671,457 B2 | 6/2020 | Flajslik et al. |
| 2008/0002591 A1 | 1/2008 | Ueno |
| 2008/0127203 A1* | 5/2008 | Huang ............... G06F 9/546 719/313 |

(Continued)

OTHER PUBLICATIONS

Bonachea, "GASNet Specification, v1.1," Technical Report UCB/CSD-02-1207, Oct. 2002, 37 pages.

(Continued)

*Primary Examiner* — Kevin L Young
*Assistant Examiner* — Kimberly L Jordan
(74) *Attorney, Agent, or Firm* — HANLEY, FLIGHT & ZIMMERMAN, LLC

(57) ABSTRACT

Systems, apparatuses and methods may provide for detecting an outbound communication and identifying a context of the outbound communication. Additionally, a completion status of the outbound communication may be tracked relative to the context. In one example, tracking the completion status includes incrementing a sent messages counter associated with the context in response to the outbound communication, detecting an acknowledgement of the outbound communication based on a network response to the outbound communication, incrementing a received acknowledgements counter associated with the context in response to the acknowledgement, comparing the sent messages counter to the received acknowledgements counter, and triggering a per-context memory ordering operation if the sent messages counter and the received acknowledgements counter have matching values.

30 Claims, 5 Drawing Sheets

(56) References Cited

U.S. PATENT DOCUMENTS

| | | | |
|---|---|---|---|
| 2008/0313661 A1* | 12/2008 | Blocksome | G06F 9/52 719/330 |
| 2009/0198762 A1 | 8/2009 | Arimilli et al. | |
| 2014/0160138 A1* | 6/2014 | Nalluri | G09G 5/001 345/541 |
| 2015/0289159 A1 | 10/2015 | Jeong et al. | |

OTHER PUBLICATIONS

Curtis et al., "OpenSHMEM: Application Programming Interface," <www.openshmem.org>, Jun. 3, 2014, 74 pages.

Sridharan et al. "Enabling Efficient Multithreaded MPI Communication Through a Library-based Implementation of MPI Endpoints," IEEE, 26th International Conference for High Performance Computing, Networking, Storage, and Analysis, Nov. 2014, 12 pages.

Nieplocha et al., "ARMCI: A Portable Remote Memory Copy Library for Distributed Array Libraries and Compiler Run-time Systems," Proceedings of the IPPS/SPDP '99 Workshops Held in Conjunction with the 13th International Parallel Processing Symposium and 10th Symposium on Parallel and Distributed Processing, 1999, 14 pages.

Kumar et al., "PAMI: A Parallel Active Message Interface for the Blue Gene/Q Supercomputer," IEEE 26th International Parallel and Distributed Processing Symposim, May 2012, 11 pages.

Dinan et al. "Enabling Communication Concurrency through Flexible MPI Endpoints," Int. J. High Performance Computing Applications, Dec. 2013, 11 pages.

Dinan et al. "Contexts: A Mechanism for High Throughput Communication in OpenSHMEM," Intel Corporation PGAS 14, 8th International Conference on Partitioned Global Address Space Programming Models, ACM, 2014, 9 pages.

Bruggencate et al., "Thread-safe SHMEM Extensions," OpenSHMEM, Mar. 2014, 8 pages.

United States Patent and Trademark Office, "Notice of Allowance," mailed in connection with U.S. Appl. No. 14/670,733, dated Jan. 23, 2020, 8 pages.

United States Patent and Trademark Office, "Non-final Office Action," mailed in connection with U.S. Appl. No. 14/670,733, dated Apr. 29, 2019, 13 pages.

United States Patent and Trademark Office, "Advisory Action," mailed in connection with U.S. Appl. No. 14/670,733, dated Sep. 4, 2018, 3 pages.

United States Patent and Trademark Office, "Final Office Action," mailed in connection with U.S. Appl. No. 14/670,733, dated May 17, 2018, 11 pages.

United States Patent and Trademark Office, "Non-final Office Action," mailed in connection with U.S. Appl. No. 14/670,733, dated Sep. 26, 2017, 11 pages.

United States Patent and Trademark Office, "Non-final Office Action," mailed in connection with U.S. Appl. No. 14/670,733, dated Jan. 12, 2017, 10 pages.

* cited by examiner

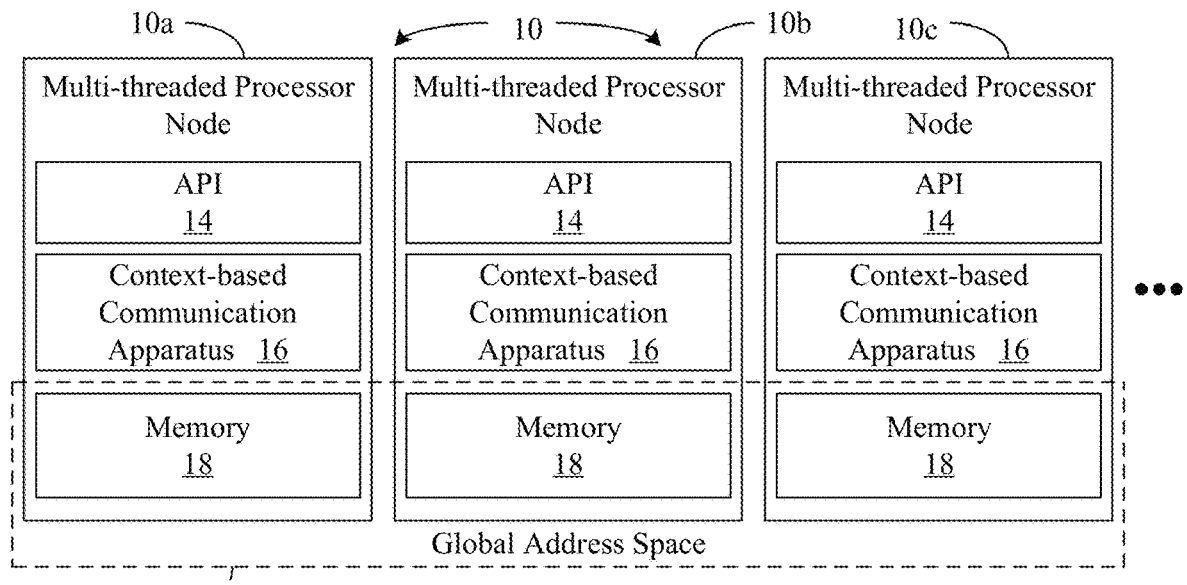
FIG. 1
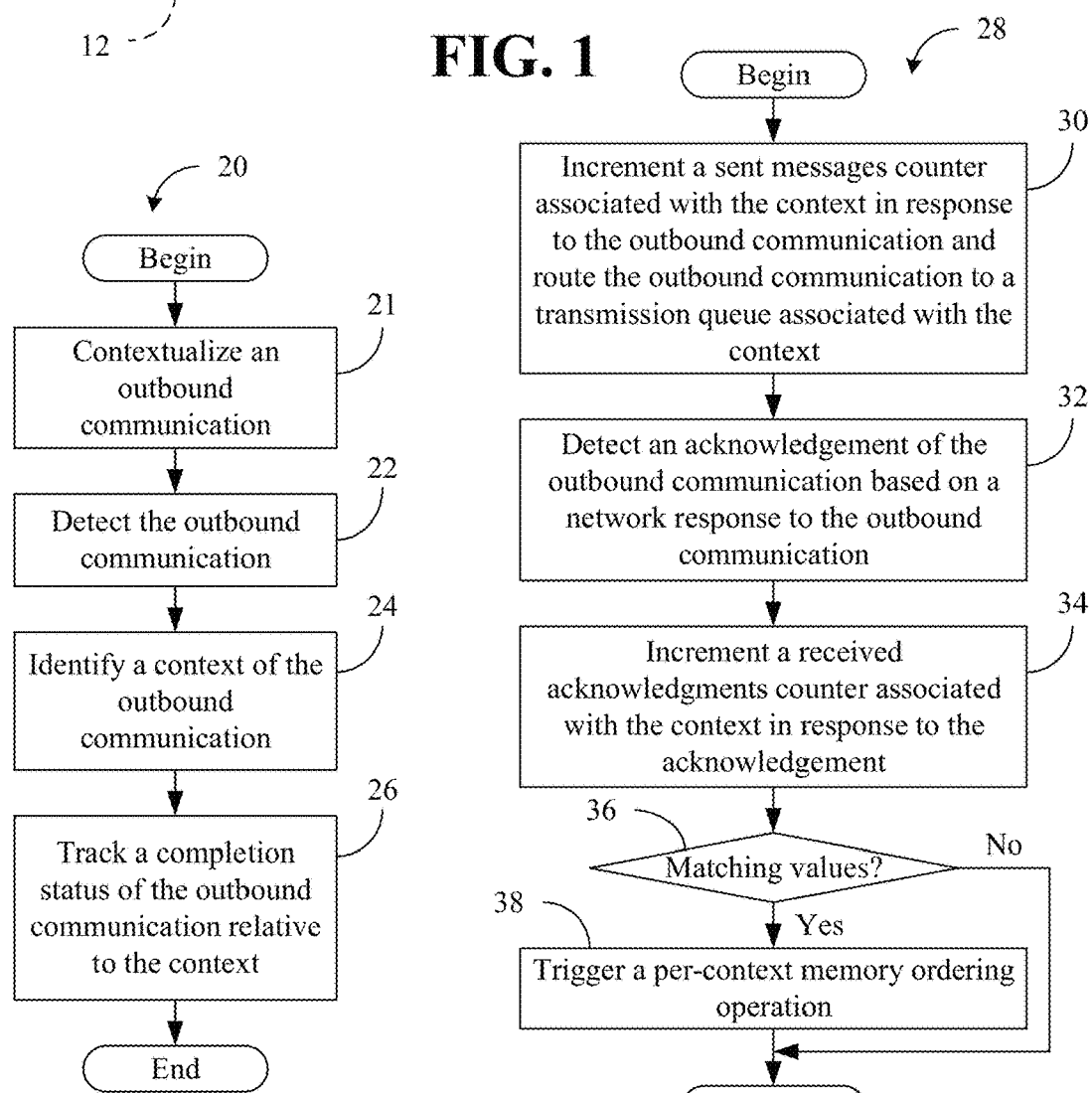
FIG. 2
FIG. 3

ISOLATING COMMUNICATION STREAMS TO ACHIEVE HIGH PERFORMANCE MULTI-THREADED COMMUNICATION FOR GLOBAL ADDRESS SPACE PROGRAMS

GOVERNMENT INTEREST STATEMENT

This invention was made with Government support under contract number H98230-13-D-0124 awarded by the Department of Defense. The Government has certain rights in this invention.

CROSS-REFERENCE TO RELATED APPLICATIONS

This application claims the benefit of priority to U.S. patent application Ser. No. 14/670,733 filed Mar. 27, 2015.

TECHNICAL FIELD

Embodiments generally relate to communication streams involving partitioned global address space computing architectures. More particularly, embodiments relate to isolating communication streams to achieve high performance multi-threaded communication for partitioned global address space programs.

BACKGROUND

Conventional high performance computing (HPC) architectures such as supercomputing environments may mix a multi-threaded, shared memory programming model with a multi-node global address space (GAS) model. Such an approach may encounter significant challenges to communication performance, which may be caused by destructive interference between threads.

BRIEF DESCRIPTION OF THE DRAWINGS

The various advantages of the embodiments will become apparent to one skilled in the art by reading the following specification and appended claims, and by referencing the following drawings, in which:

FIG. 1 is a block diagram of an example of a multi-threaded computing architecture having a global address space according to an embodiment;

FIG. 2 is a flowchart of an example of a method of isolating communication streams according to an embodiment;

FIG. 3 is a flowchart of an example of a method of tracking a completion status of an outbound communication according to an embodiment;

DESCRIPTION OF EMBODIMENTS

Figure 4:
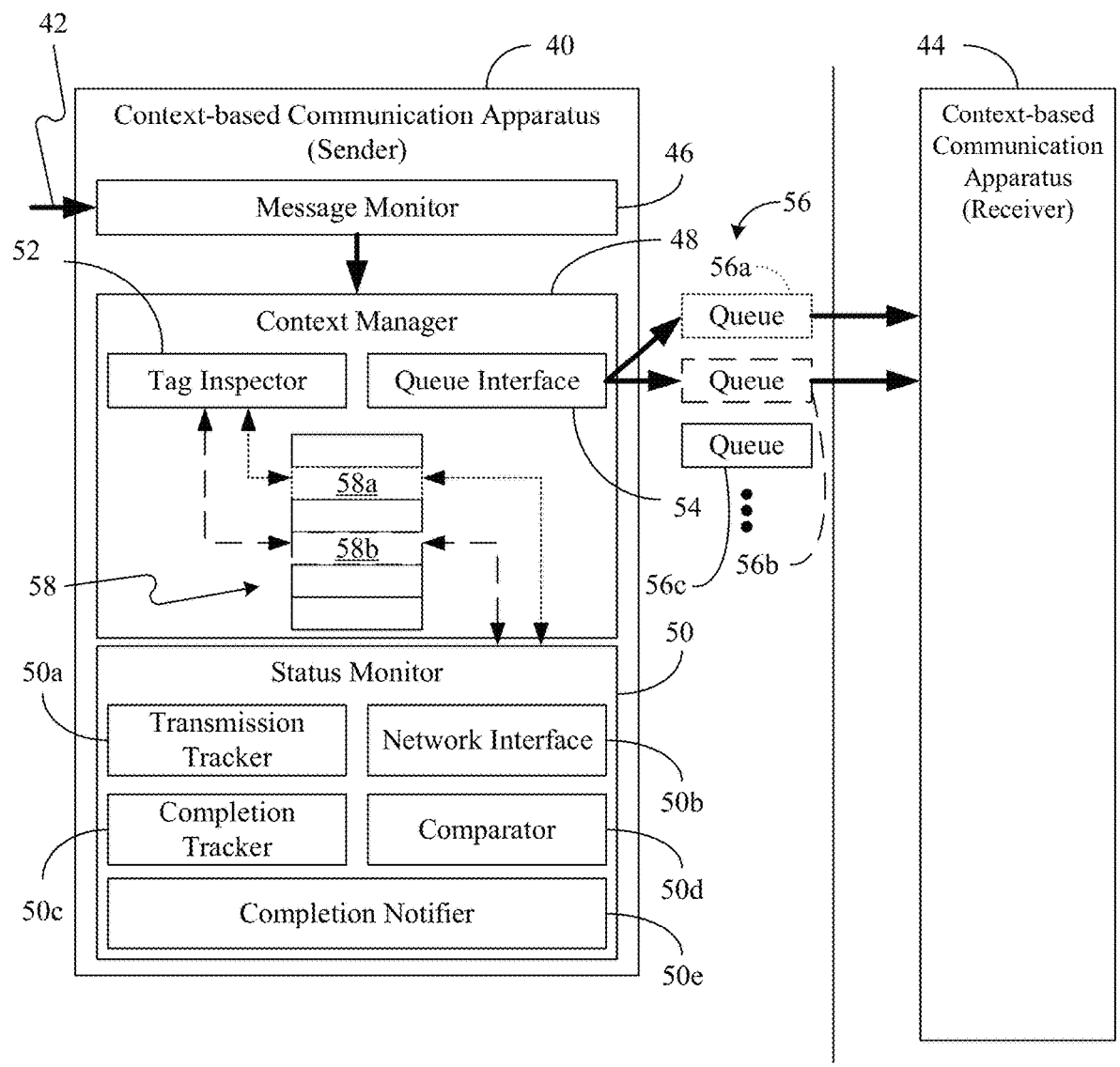
FIG. 4 is a block diagram of an example of sender and receiver context-based communication apparatuses according to an embodiment.

Turning now to FIG. 1, a multi-threaded computing architecture is shown in which a plurality of multi-threaded processor nodes 10 (10a-10c, e.g., each having multiple processor cores) share a global address space 12 associated with memory 18 that is logically partitioned across the processor nodes 10. Each node 10 may also include additional memory (not shown) that is not part of the global address space 12. The illustrated architecture may generally be used in a high performance computing (HPC) environment such as, for example, a supercomputer capable of performing many computations in parallel and at a relatively fast rate. During such computations, the processor nodes 10 may communicate with one another, wherein at any given moment in time, a particular processor node 10 may function as a sender and/or receiver of information. Moreover, the communication streams between the processor nodes 10 may have different contexts (e.g., corresponding to a particular thread), which may potentially interfere with one another. For example, one thread might repeatedly issue communication requests in a tight loop while another thread may repeatedly enforce memory ordering (e.g., by "calling quiet"), wherein the communication requests of the first thread may potentially prevent the quiet condition of the second thread from otherwise being met.

Accordingly, each processor node 10 may include an application programming interface (API) 14 that labels/tags (e.g., contextualizes) outbound communications with context information and a context-based communication apparatus 16 that isolates the communication streams from one another based on the context information. Such an approach may enable independent communication streams, eliminate thread interference, avoid resource contention, improve processor utilization, facilitate per-communication-stream ordering, enable out-of-order communications, and so forth.

Turning now to FIG. 2, a method 20 of isolating communication streams is shown. The method 20 may generally be implemented in one or more APIs such as the APIs 14 (FIG. 1) and/or one or more context-based communication apparatuses such as the communication apparatuses 16 (FIG. 1), already discussed. More particularly, the method 20 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 20 may be written in any combination of one or more programming languages, including an object oriented programming language such as C#, JAVA or the like.

Illustrated processing block 21 provides for contextualizing an outbound communication such as, for example, a put, get, atomic, memory ordering (e.g., fence, quiet), or other operation. The outbound communication may originate from user code such as a computational application, operating system (OS) or other program. As already noted, the outbound communication may be directed to a global address space such as, for example, the global address space 12 (FIG. 1), in a multi-threaded architecture. Contextualizing the outbound communication may involve tagging the outbound communication with an indicator of a context associated with the communication. Block 22 may detect the outbound communication, wherein block 24 may identify a context of the outbound communication. In one example, the context is identified based on a tag in the outbound communication. For example, a put operation might be formulated as "ctx_put(ctx2, target address, length . . . )", wherein "ctx_" indicates that the operation has a context and "ctx2" identifies the particular context of the operation (e.g., context #2). An atomic operation for a different context, on the other hand, may be formulated as "ctx_atomic(ctx4, target address, length . . . ). Illustrated block 26 tracks the completion status of the outbound communication relative to the context.

FIG. 3 shows a method 28 of tracking the completion status of an outbound communication. The method 28, which may readily be substituted for block 26 (FIG. 2), may generally be implemented in one or more context-based communication apparatuses such as the communication apparatuses 16 (FIG. 1), already discussed. More particularly, the method 28 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 30 provides for incrementing a sent messages counter (e.g., SMC) associated with a particular context in response to the outbound communication. Block 30 may also involve routing the outbound communication to a transmission queue associated with the context. While the transmission queue may be one of multiple transmission queues located on, for example, a network interface card/NIC, it is possible to have more contexts than transmission queues by mapping multiple contexts to the same queue (e.g., using a hashing function).

Additionally, an acknowledgement of the outbound communication may be detected at block 32 based on a network response to the outbound communication. The network response may generally include a response from a network device that is responsible for monitoring and/or preventing information/packet losses. For example, the network response might be a transmission acknowledgement message from the receiver of the outbound message, wherein the acknowledgement message contains a handle (e.g., in a header of the acknowledgement message) corresponding to the context tag identified in the original outbound communication. In this regard, the illustrated approach may be a sender-side solution that involves no changes on the receiver-side. In addition to its simplicity, a benefit of a sender-only construct may be that creation and destruction of contexts may be a purely local operation that does not require synchronization between processes. Moreover, each process may have differing numbers of contexts based on, for example, the number of threads at that process.

Block 34 may increment a received acknowledgements counter (e.g., RAC) associated with the context in response to the acknowledgement, wherein a comparison may be made at block 36 in order to determine whether the RAC and the SMC have matching values. If so, a per-context memory ordering operation may be triggered (e.g., if requested by the application) for the global address space at block 38. The per-context memory ordering operation may include, for example, a memory fence/barrier operation that enforces an ordering constraint on memory operations issued before and after the fence/barrier instruction (e.g., in order to achieve consistency in the global address space), a memory quiet operation to ensure that no communications are pending, and so forth. If, on the other hand, there is no pending memory ordering operation for the given context, block 38 may be bypassed.

The flow diagrams in FIGS. 2 and 3 are for a single communication message. Multiple communication messages might be in flight at the same time on one or more contexts, with each of those messages following flow diagrams in FIGS. 2 and 3. For each message, block 32 may take much longer compared to other blocks illustrated in FIGS. 2 and 3 because block 32 may include network round trip time, while the other illustrated blocks are local operations. It may be common that multiple messages reach the stage of block 30 and increment the SMC before any of them reaches block 34 and increments the RAC. As these messages progress and reach block 36, the counter comparison between SMC and RAC fails for all messages except for the last one, which may then trigger the per-context memory ordering operation.

FIG. 4 shows a sender communication apparatus 40 that receives an outbound communication 42 (e.g., put operation, get operation, memory ordering operation) destined for a receiver communication apparatus 44 in a multi-threaded architecture having a global address space. The communication apparatuses 40, 44 may be readily substituted for two or more of the context-based communication apparatuses 16 (FIG. 1), already discussed. In the illustrated example, a message monitor 46 detects the outbound communication 42 and a context manager 48 generally identifies a context of the outbound communication 42. Additionally, a status monitor 50 (50a-50e) may track a completion status of the outbound communication 42 relative to the context.

More particularly, the context manager 48 may include a tag inspector 52 that identifies the context based on a tag (e.g., ctx1, ctx2, ctx3 . . . ) in the outbound communication 42. The context manager 48 may also include a queue interface 54 that routes the outbound communication 42 to a transmission queue 56 (56a-56c) associated with the context. Thus, if the outbound communication 42 is associated with a particular context (e.g., ctx2), the illustrated queue interface 54 routes the outbound communication 42 to a first queue 56a that is also associated with that context. If, on the other hand, the outbound communication 42 is associated with a different context (e.g., ctx4), the queue interface 54 may route the outbound communication 42 to a second queue 56b associated with the different context. As already noted, it is possible to have more contexts than transmission queues 56 by mapping multiple contexts to the same queue (e.g., using a hashing function).

The sender communication apparatus 40 may also include a set of counters 58 (58a, 58b) to facilitate tracking of the completion status of outbound communications such as the outbound communication 42. In this regard, the status monitor 50 may include a transmission tracker 50a to increment a sent messages counter (SMC) associated with the context in response to the outbound communication 42. Additionally, a network interface 50b may detect an acknowledgement of the outbound communication 42 based on a network response to the outbound communication 42, wherein a completion tracker 50c may increment a received acknowledgements counter (RAC) associated with the context in response to the acknowledgement. Thus, the set of counters 58 may include a plurality of context-specific SMC-RAC counter pairs such as, for example, a first counter pair 58a associated with a particular context (e.g., ctx2), a second counter pair 58b associated with a different context (e.g., ctx4), and so forth. Moreover, a comparator 50d may compare the SMC to the RAC, wherein a completion notifier

50*e* may trigger, for example, a per-context memory ordering operation if the SMC and the RAC have matching values.

Figure 5:
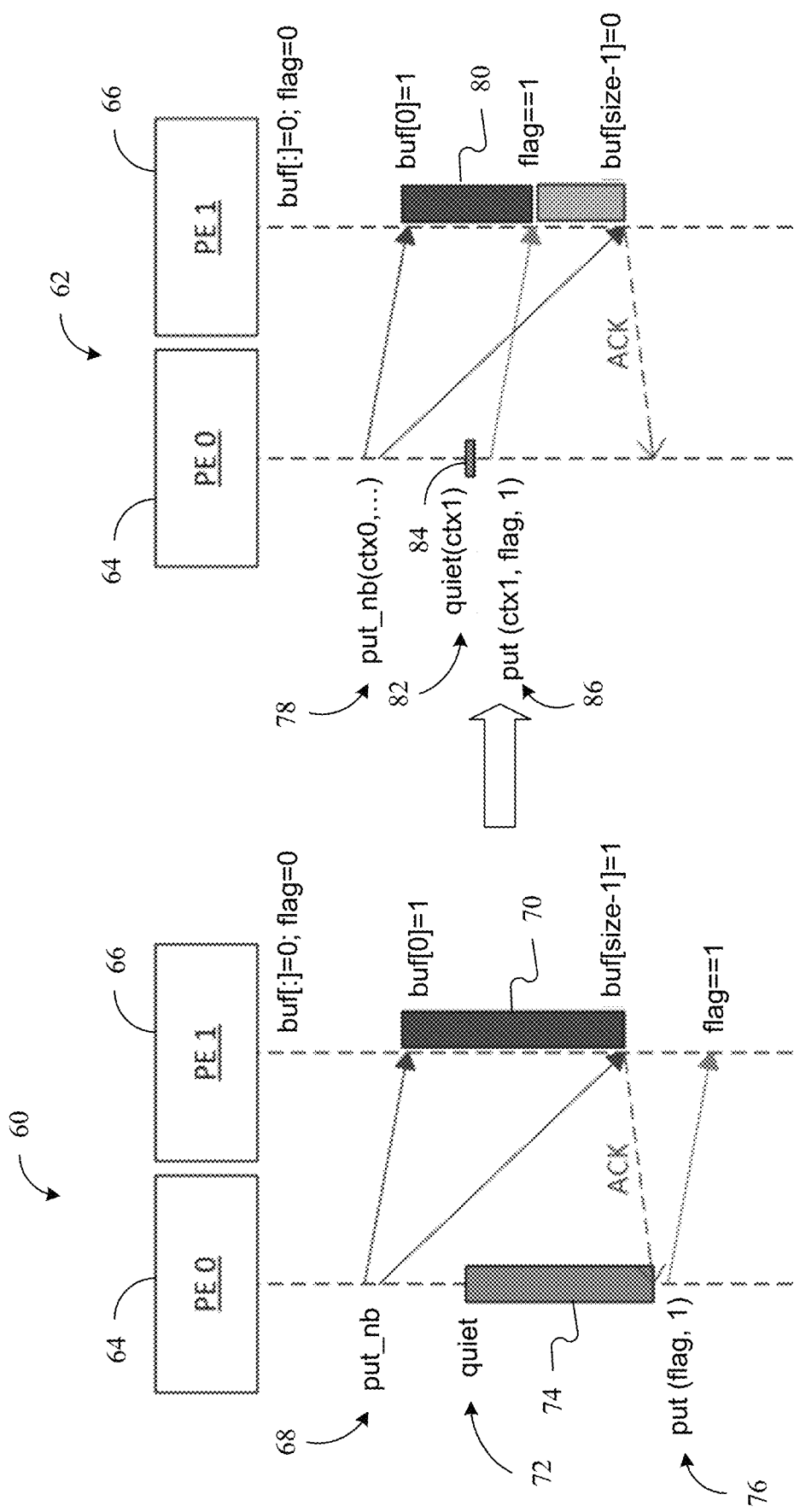
FIG. 5 is an illustration of an example of a comparison between a messaging sequence in a traditional multi-threaded architecture and a messaging sequence in a multi-threaded architecture according to an embodiment.

FIG. 5 shows an example of a comparison between a traditional messaging sequence 60 in a multi-threaded architecture and an enhanced messaging sequence 62 in a multi-threaded architecture according to techniques described herein. In the illustrated example, a first processor node 64 (e.g., processing element/PE 0) generally communicates with a second processor node 66 (e.g., PE 1) in a multi-threaded architecture having a global address space. More particularly, in the traditional messaging sequence 60, the illustrated first processor node 64 executes the following pseudo-code sequence:

memset(src_buf, 0, buf_size);
  barrier( )
  put_nb(dst_buf, src_buf, buf_size, target_PE=1);
  quiet( )
  put(flag, value=1, target_PE=1);

The second processor node 66 executes the following pseudo-code sequence:

memset(dst_buf, 1, buf_size);
  flag=0;
  barrier( )
  wait_until(flag==1);

In the illustrated traditional messaging sequence 60, a first outbound communication 68 associated with a first context (ctx0, not tagged) is a non-blocking (nb) put operation that results in a remote wait period 70 at the second processor node 66. A quiet operation 72 associated with a second context (ctx1, not tagged) generates a local wait period 74 at the first processor node 64 (e.g., corresponding to the amount of time required to update the target buffer), wherein a second outbound communication 76 associated with the second context is not transmitted until an acknowledgement message ("ACK") is received from the second processor node 66. Because the illustrated traditional messaging sequence 60 lacks global address space communication contexts, the transmission of the second outbound communication 76 may be delayed even though the first outbound communication 68 was a non-blocking put operation. Moreover, the second processor node 66 may be unable to observe the illustrated flag being updated to the value of "1" until the entire buffer is updated. The unnecessary delay in the illustrated traditional messaging sequence 60 may negatively impact performance, efficiency, power consumption, battery life, and so forth, from the perspective of both the first processor node 64 and the second processor node 66.

By contrast, in the enhanced messaging sequence 62, the first processor node 64 executes the following pseudo-code sequence:

memset(src_buf, 0, buf_size);
  barrier( )
  ctx_put_nb(ctx0, dst_buf, src_buf, buf_size, target_PE=1);
  ctx_quiet(ctx1);
  ctx_intp(ctx1, flag, value=1, target_PE=1);

The second processor node 66 executes the following pseudo-code sequence:

memset(dst_buf, 1, buf_size);
  flag=0;
  barrier( )
  wait_until(flag==1);

In the illustrated enhanced messaging sequence 62, a first outbound communication 78 associated with a first context (ctx0, tagged) is a non-blocking (nb) put operation that results in a remote wait period 80 at the second processor node 66. A quiet operation 82 associated with a second context (ctx1, tagged) generates a local wait period 84 at the first processor node 64, wherein a second outbound communication 86 associated with the second context is transmitted without regard to whether an acknowledgement message ("ACK") has been received from the second processor node 66. Because the illustrated enhanced messaging sequence 62 uses global address space communication contexts, the transmission of the second outbound communication 86 may take place sooner and the second processor node 66 is able to observe the illustrated flag being updated to the value of "1" while the target buffer is still being updated. Accordingly, the illustrated enhanced messaging sequence 62 may improve performance, efficiency, power consumption, battery life, and so forth, from the perspective of both the first processor node 64 and the second processor node 66.

Figure 6:
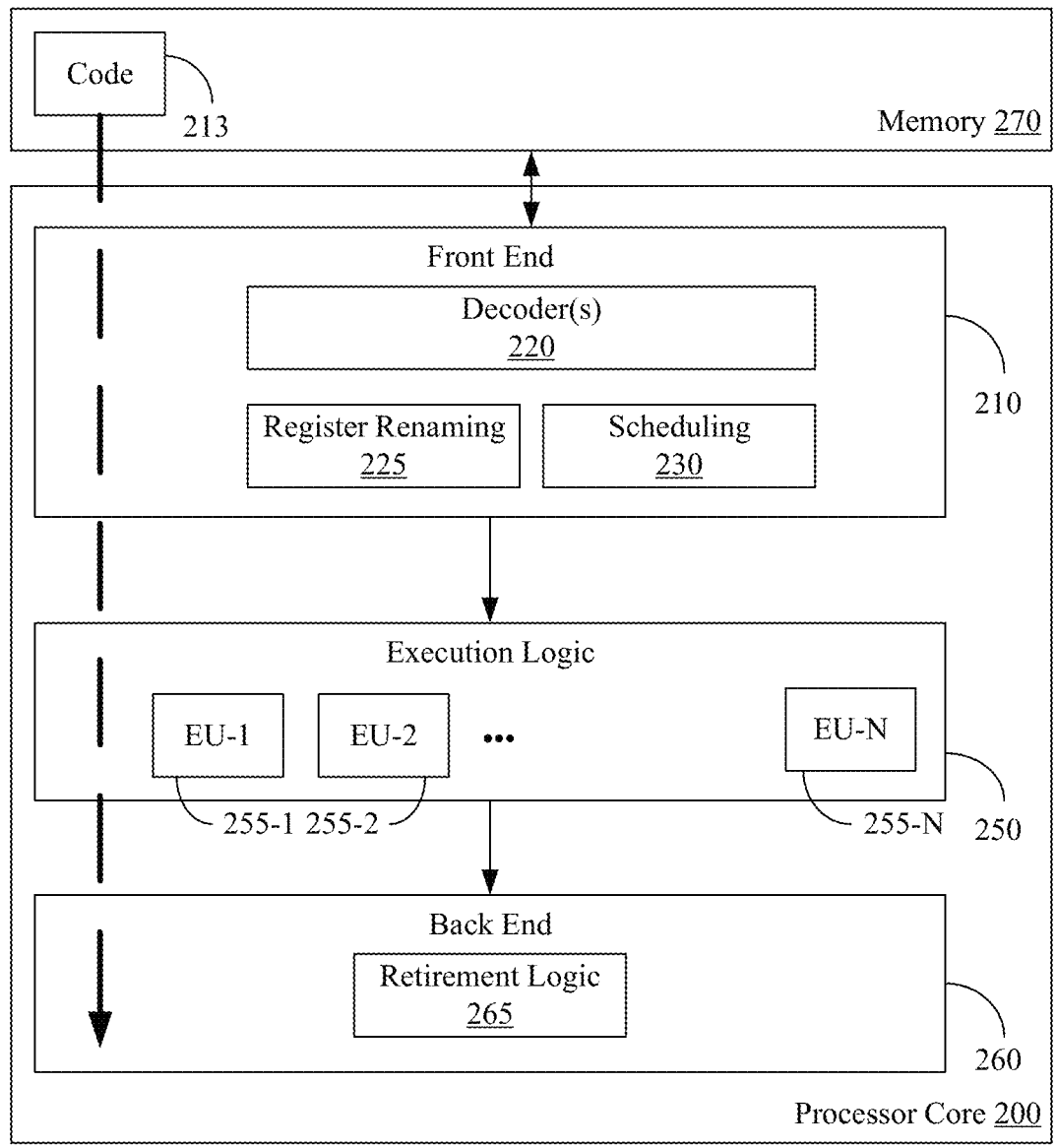
FIG. 6 is a block diagram of an example of a processor according to an embodiment.

FIG. 6 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 6, a processing element may alternatively include more than one of the processor core 200 illustrated in FIG. 6. The processor core 200 may be a single-threaded core or, for at least one embodiment, the processor core 200 may be multithreaded in that it may include more than one hardware thread context (or "logical processor") per core.

FIG. 6 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 20 (FIG. 2) and/or the method 28 (FIG. 3), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 6, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 7:
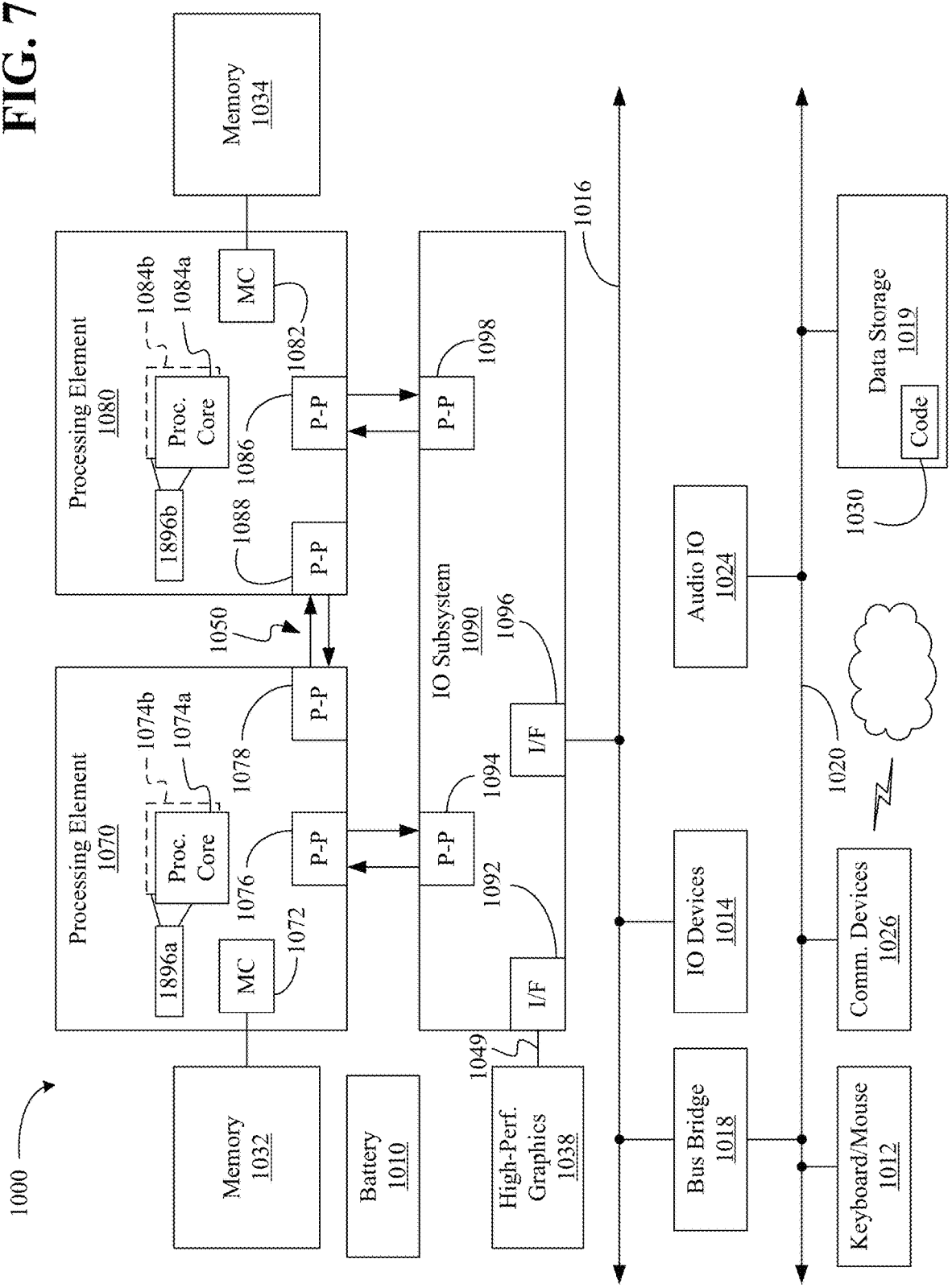
FIG. 7 is a block diagram of an example of a system according to an embodiment.

Referring now to FIG. 7, shown is a block diagram of a system 1000 embodiment in accordance with an embodiment. Shown in FIG. 7 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 7 may be implemented as a multi-drop bus rather than point-to-point interconnect.

As shown in FIG. 7, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 6.

Each processing element 1070, 1080 may include at least one shared cache 1896a, 1896b (e.g., static random access memory/SRAM). The shared cache 1896a, 1896b may store data (e.g., objects, instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 7, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 7, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 7, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the method 20 (FIG. 2) and/or the method 28 (FIG. 3), already discussed, and may be similar to the code 213 (FIG. 6), already discussed. Further, an audio I/O 1024 may be coupled to second bus 1020.

Note that other embodiments are contemplated. For example, instead of the point-to-point architecture of FIG. 7, a system may implement a multi-drop bus or another such communication topology. Also, the elements of FIG. 7 may alternatively be partitioned using more or fewer integrated chips than shown in FIG. 7. Moreover, the network controllers/communication device(s) 1026 may be implemented as a HFI (host fabric interface), also known as NIC (network interface card), that is integrated with one or more of the processing elements 1070, 1080 either on the same die, or in the same package.

Additional Notes and Examples

Example 1 may include a high performance computing (HPC) system comprising a processor node to issue an outbound communication and a communication apparatus comprising a message monitor to detect the outbound communication, a context manager to identify a context of the outbound communication, and a status monitor to track a completion status of the outbound communication relative to the context.

Example 2 may include the system of Example 1, wherein the status monitor includes a transmission tracker to increment a sent messages counter associated with the context in response to the outbound communication, a network interface to detect an acknowledgement of the outbound communication based on a network response to the outbound communication, a completion tracker to increment a received acknowledgements counter associated with the context in response to the acknowledgement, a comparator to compare the sent messages counter to the received acknowledgements counter, and a completion notifier to trigger a per-context memory ordering operation if the sent messages counter and the received acknowledgements counter have matching values.

Example 3 may include the system of Example 1, wherein the processor node is to incorporate a tag into the outbound communication and the context manager includes a tag inspector to identify the context based on the tag.

Example 4 may include the system of Example 1, wherein the outbound communication is to include one or more of a put operation, a get operation, an atomic operation or a memory ordering operation.

Example 5 may include the system of Example 1, further including a set of transmission queues, wherein the context manager includes a queue interface to route the outbound communication to a transmission queue associated with the context.

Example 6 may include the system of any one of Examples 1 to 5, wherein the outbound communication is to be directed to a global address space in a multi-threaded architecture.

Example 7 may include a communication apparatus comprising a message monitor to detect an outbound communication, a context manager to identify a context of the outbound communication, and a status monitor to track a completion status of the outbound communication relative to the context.

Example 8 may include the apparatus of Example 7, wherein the status monitor includes a transmission tracker to increment a sent messages counter associated with the context in response to the outbound communication, a network interface to detect an acknowledgement of the outbound communication based on a network response to the outbound communication, a completion tracker to increment a received acknowledgements counter associated with the context in response to the acknowledgement, a comparator to compare the sent messages counter to the received acknowledgements counter, and a completion notifier to trigger a per-context memory ordering operation if the sent messages counter and the received acknowledgements counter have matching values.

Example 9 may include the apparatus of Example 7, wherein the context manager includes a tag inspector to identify the context based on a tag in the outbound communication.

Example 10 may include the apparatus of Example 7, wherein the context manager includes a queue interface to route the outbound communication to a transmission queue associated with the context.

Example 11 may include the apparatus of Example 7, wherein the outbound communication is to include one or more of a put operation, a get operation, an atomic operation or a memory ordering operation.

Example 12 may include the apparatus of any one of Examples 7 to 11, wherein the outbound communication is to be directed to a global address space in a multi-threaded architecture.

Example 13 may include a method of isolating communication streams comprising detecting an outbound communication, identifying a context of the outbound communication, and tracking a completion status of the outbound communication relative to the context.

Example 14 may include the method of Example 13, wherein tracking the completion status includes incrementing a sent messages counter associated with the context in response to the outbound communication, detecting an acknowledgement of the outbound communication based on a network response to the outbound communication, incrementing a received acknowledgements counter associated with the context in response to the acknowledgement, comparing the sent messages counter to the received acknowledgements counter, and triggering a per-context memory ordering operation if the sent messages counter and the received acknowledgements counter have matching values.

Example 15 may include the method of Example 13, wherein the context is identified based on a tag in the outbound communication.

Example 16 may include the method of Example 13, further including routing the outbound communication to a transmission queue associated with the context.

Example 17 may include the method of Example 13, wherein the outbound communication includes one or more of a put operation, a get operation, an atomic operation or a memory ordering operation.

Example 18 may include the method of any one of Examples 13 to 17, wherein the outbound communication is directed to a global address space in a multi-threaded architecture.

Example 19 may include at least one computer readable storage medium comprising a set of instructions which, when executed by a device, cause the device to detect an outbound communication, identify a context of the outbound communication, and track a completion status of the outbound communication relative to the context.

Example 20 may include the at least one computer readable storage medium of Example 19, wherein the instructions, when executed, cause a device to increment a sent messages counter associated with the context in response to the outbound communication, detect an acknowledgement of the outbound communication based on a network response to the outbound communication, incrementing a received acknowledgements counter associated with the context in response to the acknowledgement, compare the sent messages counter to the received acknowledgements counter, and trigger a per-context memory ordering operation if the sent messages counter and the received acknowledgements counter have matching values.

Example 21 may include the at least one computer readable storage medium of Example 19, wherein the context is to be identified based on a tag in the outbound communication.

Example 22 may include the at least one computer readable storage medium of Example 19, wherein the instructions, when executed, cause a device to route the outbound communication to a transmission queue associated with the context.

Example 23 may include the at least one computer readable storage medium of Example 19, wherein the outbound communication is to include one or more of a put operation, a get operation, an atomic operation or a memory ordering operation.

Example 24 may include the at least one computer readable storage medium of any one of Examples 19 to 23, wherein the outbound communication is to be directed to a global address space in a multi-threaded architecture.

Example 25 may include an apparatus to isolate communication streams, comprising means for detecting an outbound communication, means for identifying a context of the outbound communication, and means for tracking a completion status of the outbound communication relative to the context.

Example 26 may include the apparatus of Example 25, wherein the means for tracking the completion status includes means for incrementing a sent messages counter associated with the context in response to the outbound communication, means for detecting an acknowledgement of the outbound communication based on a network response to the outbound communication, means for incrementing a received acknowledgements counter associated with the context in response to the acknowledgement, means for comparing the sent messages counter to the received acknowledgements counter, and means for triggering a per-context memory ordering operation if the sent messages counter and the received acknowledgements counter have matching values.

Example 27 may include the apparatus of Example 25, wherein the context is to be identified based on a tag in the outbound communication.

Example 28 may include the apparatus of Example 25, further including means for routing the outbound communication to a transmission queue associated with the context.

Example 29 may include the apparatus of Example 25, wherein the outbound communication is to include one or more of a put operation, a get operation, an atomic operation or a memory ordering operation.

Example 30 may include the apparatus of any one of Examples 25 to 29, wherein the outbound communication is to be directed to a global address space in a multi-threaded architecture.

Thus, techniques described herein may provide an API that includes a contextualized version of communication and memory ordering calls (e.g., put, get, quiet, etc.). User code/programs may tag calls through this API with the appropriate context, wherein the API provides a way to quiesce or complete an arbitrary set of communication operation. Based on the context in question, a communication apparatus may direct a given communication to a dedicated set of resources assigned to that context. The communication apparatus may also track completion of communication operations (e.g., end-to-end completion acknowledgement messages) to the appropriate context. As a result, isolation among communication streams and high performance multi-threaded communication may be obtained for global address space programs.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An integrated circuit comprising:
   processor circuitry including first and second cores;
   message monitor circuitry to detect a first outbound communication and a second outbound communication from the first core to the second core;
   context manager circuitry to:
      identify a first context assigned to the first outbound communication, the first context associated with a first process to be executed on the second core, the first outbound communication to trigger a notification; and
      identify a second context assigned to the second outbound communication, the second context associated with a second process to be executed on the second core, the second context equal to the first context when operations of the second process are the same as operations of the first process, the second context different than the first context when the operations of the second process are different than the operations of the first process; and logic circuitry to control access to data in a memory space based on one or more logic values associated with one or more access count values, the memory space shared by the first and second cores.

2. The integrated circuit as defined in claim 1, wherein the message monitor circuitry is to increment a sent messages counter in response to detecting the first or the second outbound communication from the first core to the second core.

3. The integrated circuit as defined in claim 2, wherein the message monitor circuitry is to increment a received acknowledgements counter in response to detecting a first or a second return communication from the second core to the first core, wherein the first and second return communications are associated with respective ones of the first and second outbound communications.

4. The integrated circuit as defined in claim 3, wherein the message monitor circuitry is to compare a value of the sent messages counter to a value of the received acknowledgements counter to determine the access count values.

5. The integrated circuit as defined in claim 4, wherein the message monitor circuitry is to decrement respective ones of the access count values when the first or second outbound communication from the first core to the second core matches a tag of the first or second return communication from the second core to the first core.

6. The integrated circuit as defined in claim 1, further including an interconnect channel to communicatively connect the first core to the second core.

7. The integrated circuit as defined in claim 1, wherein the message monitor circuitry is to isolate a portion of the first or second outbound communication based on at least one of the first context or the second context.

8. The integrated circuit as defined in claim 1 wherein the notification includes an acknowledgement message from the second core to the first core.

9. The integrated circuit as defined in claim 8, wherein the message monitor circuitry is to detect at least one of the first context or the second context in a header of the acknowledgement message.

10. The integrated circuit as defined in claim 1, wherein the logic circuitry is to control the access to the data in the memory space by triggering a memory ordering operation.

11. The integrated circuit as defined in claim 10, wherein the memory ordering operation includes at least one of a barrier operation to enforce a memory ordering constraint, or a memory quiet operation to identify a pending communication between the first core and the second core.

12. At least one non-transitory computer readable storage device comprising instructions that, when executed, cause at least one processor to at least:

detect a first outbound communication and a second outbound communication from a first core to a second core;

identify a first context assigned to the first outbound communication, the first context associated with a first process to be executed on the second core, the first outbound communication to trigger a notification;

identify a second context assigned to the second outbound communication, the second context associated with a second process to be executed on the second core, the second context equal to the first context when operations of the second process are the same as operations of the first process, the second context different than the first context when the operations of the second process are different than the operations of the first process; and control access to data in a memory space based on logic values associated with access count values, the memory space shared by the first core and the second core.

13. The at least one non-transitory computer readable storage device as defined in claim 12, wherein the instructions, when executed, cause the at least one processor to increment a sent messages counter in response to detecting the first or second outbound communication from the first core to the second core.

14. The at least one non-transitory computer readable storage device as defined in claim 13, wherein the instructions, when executed, cause the at least one processor to increment a received acknowledgements counter in response to detecting a first or second return communication from the second core to the first core, wherein the first and second return communications are associated with respective ones of the first and second outbound communications.

15. The at least one non-transitory computer readable storage device as defined in claim 14, wherein the instructions, when executed, cause the at least one processor to compare values of the sent messages counter and the received acknowledgements counter to determine the access count values.

16. The at least one non-transitory computer readable storage device as defined in claim 15, wherein the instructions, when executed, cause the at least one processor to decrement respective ones of the access count values when the first or second outbound communication from the first core to the second core matches a tag of the first or second return communication from the second core to the first core.

17. The at least one non-transitory computer readable storage device as defined in claim 12, wherein the instructions, when executed, cause the at least one processor to isolate a portion of the first or second outbound communication based on at least one of the first context or the second context.

18. The at least one non-transitory computer readable storage device as defined in claim 12, wherein the instructions, when executed, cause the at least one processor to identify the notification as an acknowledgement message from the second core to the first core.

19. The at least one non-transitory computer readable storage device as defined in claim 18, wherein the instructions, when executed, cause the at least one processor to detect at least one of the first context or the second context in a header of the acknowledgement message.

20. The at least one non-transitory computer readable storage device as defined in claim 12, wherein the instructions, when executed, cause the at least one processor to control the access to the data in the memory space by triggering a memory ordering operation.

21. The at least one non-transitory computer readable storage device as defined in claim 20, wherein the instructions, when executed, cause the at least one processor to invoke the memory ordering operation as at least one of a barrier operation to enforce a memory ordering constraint, or a memory quiet operation to identify a pending communication between the first core and the second core.

22. A multi-core communication system comprising:

processor circuitry including first and second cores;

means for monitoring to detect a first outbound communication and a second outbound communication from the first core to the second core;

means for storing, the storing means shared by the first and second cores;

means for communication labelling to:
- assign a first context to the first outbound communication, the first context associated with a first process to be executed on the second core, the first outbound communication to trigger a notification; and
- assign a second context to the second outbound communication, the second context associated with a second process to be executed on the second core, the second context equal to the first context when operations of the second process are the same as operations of the first process, the second context different than the first context when the operations of the second process are different than the operations of the first process; and means for accessing to control access to data in the storing means based on stored logic values associated with access count values.

23. The system as defined in claim 22, wherein the monitoring means is to increment a sent messages counter in response to detecting the first or second outbound communication from the first core to the second core.

24. The system as defined in claim 23, wherein the monitoring means is to increment a received acknowledgements counter in response to detecting a first or second return communication from the second core to the first core, wherein the first and second return communications are associated with respective ones of the first and second outbound communications.

25. The system as defined in claim 24, wherein the monitoring means is to compare the sent messages counter to the received acknowledgements counter to determine the access count values.

26. The system as defined in claim 25, wherein the monitoring means is to decrement respective ones of the access count values when the first or second outbound communication from the first core to the second core matches a tag of the first or second return communication from the second core to the first core.

27. The system as defined in claim 22, further including means to communicatively connect the first core to the second core.

28. The system as defined in claim 22, wherein the monitoring means is to isolate a portion of the first or second outbound communication based on at least one of the first context or the second context.

29. The system as defined in claim 22, wherein the accessing means is to control the access to the data in the storing means by triggering a memory ordering operation.

30. The system as defined in claim 29, wherein the memory ordering operation includes at least one of a barrier operation to enforce a memory ordering constraint, or a memory quiet operation to identify a pending communication between the first core and the second core.

* * * * *